United States Patent [19]
Marantz

[11] Patent Number: 5,136,784
[45] Date of Patent: Aug. 11, 1992

[54] VEHICLE ELECTRONIC LEVEL MEASURING AND DISPLAY DEVICE

[76] Inventor: Jacob J. Marantz, 2706 SE. 14th St., Pompano Beach, Fla. 33062

[21] Appl. No.: 624,077

[22] Filed: Dec. 7, 1990

[51] Int. Cl.⁵ ............................ G01C 9/16; G01C 9/06
[52] U.S. Cl. ................................. 33/366; 33/395; 33/333
[58] Field of Search ............... 33/366, 365, 374, 391, 33/395, 401, 333, 301

[56] References Cited

U.S. PATENT DOCUMENTS

| | | | |
|---|---|---|---|
| 1,884,728 | 10/1932 | Kiesel | 33/395 |
| 2,772,411 | 11/1956 | Cooper | 33/333 |
| 2,971,264 | 2/1961 | Cowan | 33/333 |
| 4,429,470 | 2/1984 | Watanabe et al. | 33/395 |
| 4,561,188 | 12/1985 | Williams | 33/333 |
| 4,658,508 | 4/1987 | Oberg | 33/366 |
| 4,760,649 | 8/1988 | Preston et al. | 33/366 |

OTHER PUBLICATIONS

"Popular Mechanics" Dec. 1949 p. 296 *3-Directional Folding Precision Level.*

*Primary Examiner*—William A. Cuchlinski, Jr.
*Assistant Examiner*—C. W. Fulton
*Attorney, Agent, or Firm*—Malin, Haley, McHale, DiMaggio & Crosby

[57] ABSTRACT

A vehicle level and measuring and display device for use especially in recreational vehicles or the like for ensuring that the vehicle is in a gravitationally level position comprising a sensing unit remotely connected to a display unit. The display unit includes a plurality of incremental individual optical indicators disposed along a first line representative of the level position of the vehicle and a second line representing the level position of the vehicle whereby the individual LED optical elements can incrementally and individually display the particular level position of that line. The device includes at least two scales having both a rough and fine adjustment for the LED indicators.

2 Claims, 2 Drawing Sheets

VEHICLE ELECTRONIC LEVEL MEASURING AND DISPLAY DEVICE

BACKGROUND OF THE INVENTION

1. Field of the Invention

This invention relates to a vehicle level measuring and display device, and in particular to an electronically actuated level measuring and display device especially suited for a recreational vehicle in which the display is remotely displaced from the level sensing unit, which includes a display of increased indicators for enhanced refined level measurement.

2. Description of the Prior Art

The use of devices for determining when a vehicle such as a recreational vehicle is gravitationally level is known in the prior art. It is also well known that it is very important a recreational vehicle or other vehicles be positioned in a gravitationally level position for occupancy and use because of the employment of specific equipment onboard such as gas stoves, refrigerators and for sleeping. U.S. Pat. No. 4,760,649 issued to Preston, Aug. 2, 1988, shows a solid state electronic position indicating device which provides two indicators showing whether the vehicle is level or not through a pair of lights. U.S. Pat. No. 4,658,508 shows an electronic level measuring system for truck trailers which has an analog dial displaying the level position of the truck. Other devices are shown that use a pendulum to measure vehicle curve speed as shown in U.S. Pat. No. 3,798,593, issued to Sartor, Mar. 19, 1974 and an overload indicator for cranes shown in U.S. Pat. No. 2,346,066, issued to Conrad, Apr. 4, 1944. One of the problems with the devices shown in the prior art is the lack of refinement in measuring particular level positions which make the leveling operation more difficult for the user. The present invention overcomes the problems of the prior art by providing a very highly sensitive display which can switch scales to provide both a rough first measurement and a fine second measurement from the same display indicator using a plurality of optical indicators to aid in expediting the leveling operation.

BRIEF SUMMARY OF THE INVENTION

A vehicle gravitational level measuring and display device comprising a gravitational level sensing unit attached to a specific strategic location in the vehicle, a display unit located near the vehicle operator to provide the level position indicators, a D.C. power supply provided by the vehicle (12 volt) and a remote cable connection between the sensing unit and the display unit.

The sensing unit is comprised of a pair of pendulum actuated potentiometers, individually oriented along a first line and a second line so that the lines represent a plane which when level will provide a level position for the vehicle. A conversion circuit is coupled to the output of each of the potentiometers into a plurality of comparators and resistors, each of which is connected to a different light emitting diode such that the voltage to the operational amplifier and resistor circuit from each potentiometer will illuminate only one of the light emitting diode in a particular bank. A first bank of level indicators (preferably ten light emitting diodes) is coupled to a first potentiometer and a second bank of light emitting diodes, preferably ten, is connected to a second potentiometer. Each potentiometer functions independently to provide a voltage output representative of a pendulum position relative to the potentiometer designated along a particular line of orientation of the pendulum. Based on the relative orientations of the first potentiometer relative to the second potentiometer along two lines essentially crossing at a predetermined angle defines the plane which when both potentiometers register will define a gravitationally level plane.

The gravitational level display unit also includes circuitry for changing the scale of degrees of relative inclination represented by the light emitting diodes electronically such that in the ROUGH mode of operation an LED represents two degrees of inclination along the particular line relative to a gravitationally level position while in the FINE mode each LED may represent 0.5 degrees of inclination.

The display unit contains the LED's arranged in a diagonal linear array of ten in each bank of the diagonal display representing the level line for each bank. In addition the display includes another LED located in the exact center which is illuminated when both lines indicate a level position for the vehicle. This is achieved through the use of an AND circuit element connected to both banks. The display unit also includes an on/off switch and the rough-fine switch for actuating the particular scale to be used.

The entire unit may be powered by a conventional 12 volt vehicle power supply positioned and wired appropriately. In operation, the sensing unit is mounted in a predetermined position in the vehicle such that the pendulum actuated potentiometers will accurately measure the diagonal lines representing a plane which is the plane of the vehicle when it is level. The sensing unit is permanently mounted in this position. A cable connecting the sensing unit along the display unit is then run from the sensing unit to the display unit which is preferably mounted in a position for observation by the vehicle driver. This unit is then connected into the 12 volt power system of the vehicle.

To operate the device, with the power switch on, the driver will position the vehicle in accordance with the individual indications from each bank of the LEDs on the display face. The objective is to have none of the LEDs illuminated in each bank, but to have the center LED illuminated indicating a level position. The LEDs in each bank determining the level position along the line can be calculated to indicate either a high position or a low position relative to center so that the vehicle operator will move the vehicle in such a direction to reduce the high or low position along each line. The system may also be used in a vehicle in which hydraulic jacks are utilized to raise portions of the vehicle to achieve a level position by determining from each LED bank that is illuminated whether the vehicle is too low in that particular line. The operator starts using the ROUGH adjustment scale which in this case may indicate a two degree inbalance until an apparent level position is achieved and then switch to the FINE scale mode. It is an object of this invention to provide an improved vehicle measuring and display device having increased sensitivity for expediting the leveling operation.

It is another object of this invention to provide a vehicle gravitational level positioning and display device in which the display includes incremental optical indications for increased refinement in determining a level position of the vehicle.

Yet still another object of this invention is to provide a vehicle leveling display device having a plurality of optical instruments presenting level positions and a first and second scale of operation for rough and fine leveling indications in terms of relative degrees of level.

In accordance with these and other objects which will be apparent hereinafter, the instant invention will now be described with particular reference to the accompanying drawings.

PREFERRED EMBODIMENT OF THE INVENTION

Figure 1:
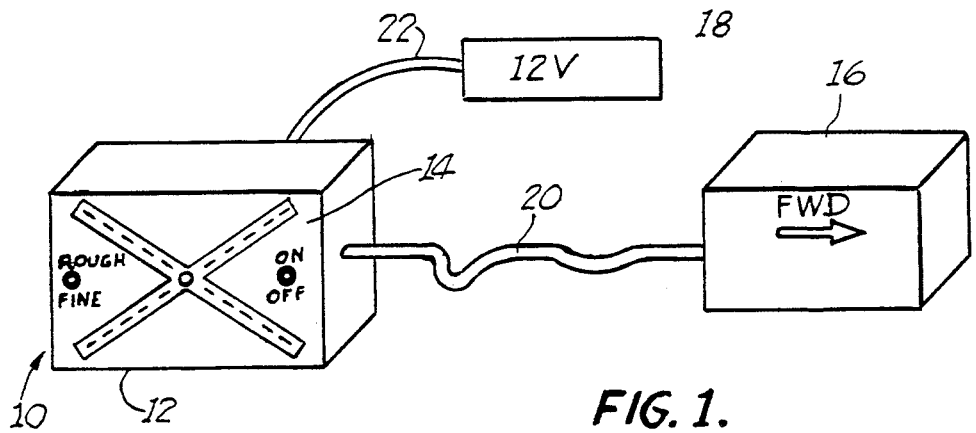
FIG. 1 shows a schematic diagram of the present invention.

Referring now to the drawings and in particular FIG. 1, the present invention is shown generally at 10 comprised of a display unit 12 having a display face 14 connected to power supply 18 representing a 12 volt vehicle power supply through connecting wires 22. A separate remote sensing unit 16 is provided and is connected to the display 12 through a connecting cable 20.

Figure 2:
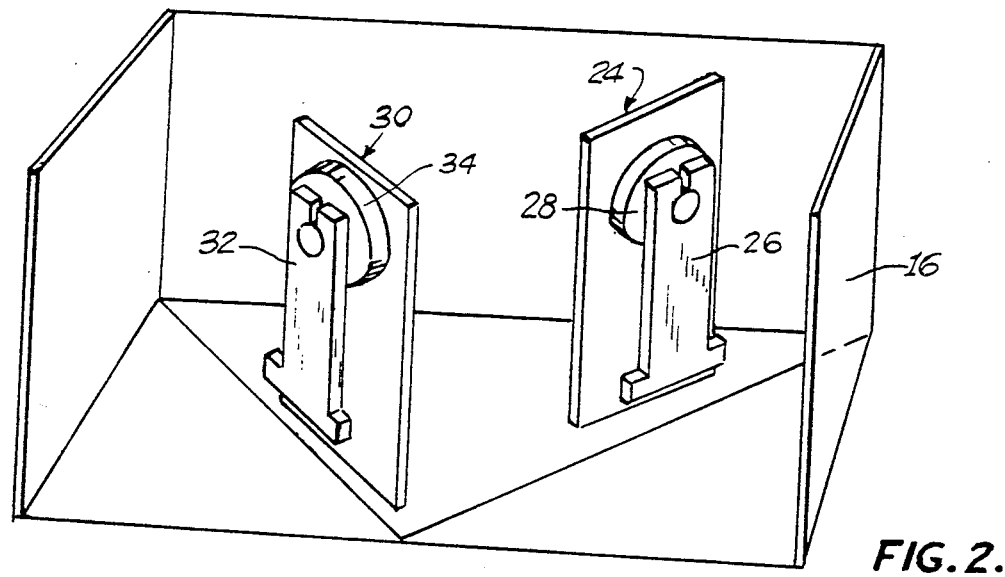
FIG. 2 shows a perspective schematic diagram of the sensing unit of the present invention.

FIG. 2 shows schematically the gravitational level sensing unit in accordance with the present invention mounted in the sensing unit box 16 comprised of first and second potentiometers 24 and 30 which are actuated respectively by gravitationally sensitive pendulums 26 and 32 having weights at their bottom end. Components 28 and 34 represent the electrical portions of the potentiometer. The associated wiring is not shown. Each potentiometer 24 and 30 is mounted along a predetermined line which represents a pair of crossing lines that determine the plane useful for the leveling of the vehicle. Therefore the bottom of the sensing unit 16 will be mounted somewhere in the vehicle in such a position so that the lines will represent positions diagonally relative to the frame and floor of the vehicle to accurately determine level positions between the four wheels of the vehicle. Each potentiometer 24 and 30 operate such that the pendulums 26 and 32 act as plumbs relative to gravitational force of the earth and move independently of the potentiometer components 28 and 34 to provide variable resistance from each potentiometer 24 and 30 to the circuits through wiring not shown as described below.

Figure 3:
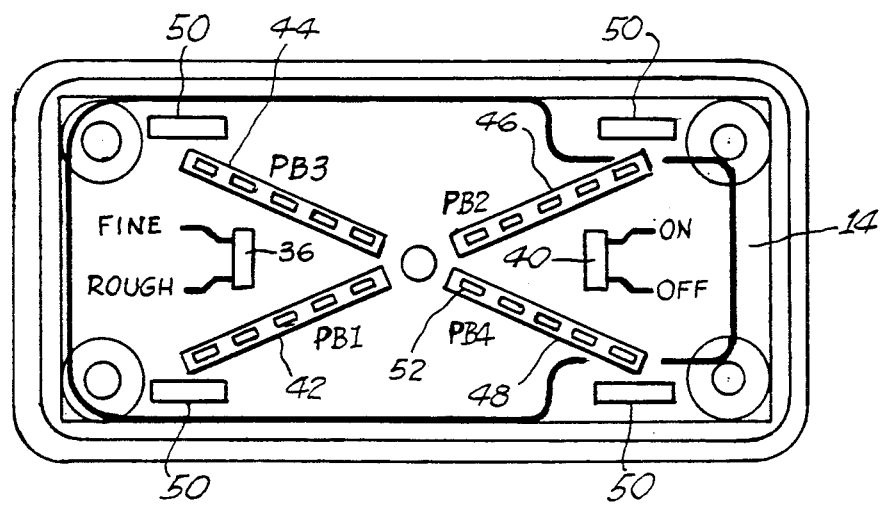
FIG. 3 shows a front elevational view of the display face for the display unit of the present invention.

Referring now to FIG. 3, the display face 14 is shown which includes indicia 50 representing the four wheels of the vehicle having diagonal boxes represented by DB1, DB2, DB3 and DB4. Each bank contains a plurality (preferably five) light emitting diodes (LEDs) 52. The display also includes an on/off switch 40 and a rough and fine scale anode switch 36. Each optical indicating bank 42, 44, 46 and 48 is oriented with their respective LED's 52 which represent the lines positioned relative to the potentiometers shown in FIG. 2 in the gravitational level sensing unit. For example LED bank 42 and 46 indicated by DB1 and DB2 would represent the position of potentiometer and pendulum 24 and 26 respectively while LED bank 44 and 48 would represent the potentiometer and pendulum in position 30 and 32 respectively and are so connected electrically through the circuitry described below. The display 14 also includes LED 38 positioned at the center point between the diagonal lines constituting LED banks to indicate a level position.

Figure 4:
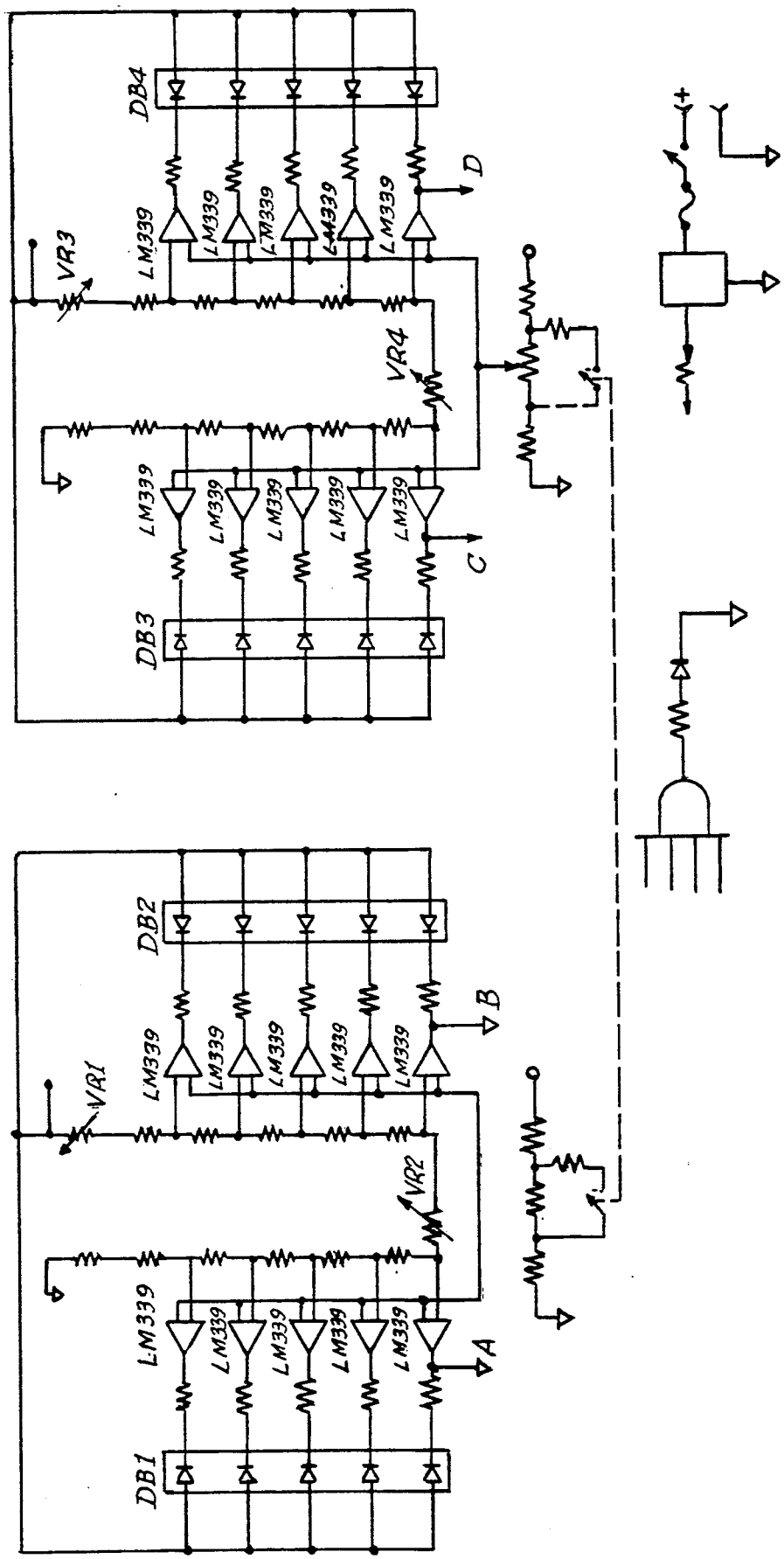
FIG. 4 shows a schematic electrical diagram of the sensing and display circuit used in the present invention.

FIG. 4 shows a schematic circuit diagram in which the LEDs bank DB1, DB2, DB3 and DB4 are shown connected through a network of operational amplifiers LM339 and resistors all of which are connected to potentiometer SEN1 and potentiometer SEN2. Switches SW1A and SW1B are connected across each of the potentiometers SEN1 and SEN2 to provide for a scale adjustment sensitivity for each bank of LEDs. In addition the circuitry includes variable resistors VR1, VR2, VR3 and VR4 for assisting adjustment which is normally done at the factory. An AND gate connected to outputs A, B, C and D is connected to LED D1 for indicating a level when the voltages are all balanced. In operation, the voltages determined by potentiometer SEN1 and SEN2 will determine how many LED's are illuminated in the bank of ten on each diagonal line. For example, for the maximum unlevel indication, all five LED's will be illuminated on one bank. As leveling improves, four, three, two, and finally one LED will be illuminated as the degrees of inclination approach level. The array of LEDs which are provided on the display face 14 (shown in FIG. 3) provide the proper illumination and level position as a function of the potentiometer voltage. To operate the device, referring back to FIG. 3, the vehicle operator will maneuver and raise the vehicle wheel positions as indicated by indicia 50 as a function of the illuminated LEDs in each bank until the center LED 38 is illuminated.

Although a total of ten optical illuminating LEDs is shown along each leveling line in the operation of the device, this number could be varied depending on the sensitivity required. Also the scale provided is such that each LED equals either two degrees of inclination from level or 0.5 degrees inclination from level which could also be varied depending on the sensitivity of the system desired.

The instant invention has been shown and described herein in what it is considered to be the most practical and preferred embodiment. It is recognized, however, that departures may be made therefrom within the scope of the invention and that obvious modifications will occur to a person skilled in the art.

What I claim is:

1. The vehicle level measuring and display device, said vehicle having a frame and floor, comprising:
    sensing means for determining a gravitationally level plane as a function of a first line and a second line crossing said first line, said sensing means having a first output signal representative of said first line level position and a second output signal representative of said second line level position, said sensing means including a circuit means for providing said first output signal and said second output signal as a function of resistance, said sensing means including a pair of potentiometers each oriented along said different predetermined first and second lines, said potentiometers having first and second outputs connected to said circuit means, each of said pair of potentiometers actuated respectively by a gravitationally sensitive pendulum, each of said pendulums having weights a its respective bottom end, said sensing means mounted on said vehicle to allow said first and second lines to represent positions diagonally relative to said frame and said floor of said vehicle;

dc power supply means connected to said sensing means;

display means, connected to said power supply, for optically displaying indications of the relative gravitational position of said first and said second line relative to a gravitational level line position, display means including a first plurality of individual light emitting diode optical indicators representative of said first line level position and a second plurality of individual light emitting diode optical indicators representative of said second line position, said display means including a means for individually illuminating one or more of said diodes along a particular said first and said second line indicative of the level position of said first line and said second line, said display means including a level optical indicator representative of said gravitationally level plane formed by said first line and said second line positions; and means connected to said display means for converting said display optical indicators from a first scale of accuracy to a second different scale of accuracy in degrees of leveling relative to said first line and said second line level position.

2. A level and measuring display device as in claim 1, wherein, said sensing means for determining said gravitationally level plane is disposed remotely from said display means.

* * * * *